US005529707A

United States Patent [19]

Kejha

[11] Patent Number: 5,529,707
[45] Date of Patent: Jun. 25, 1996

[54] LIGHTWEIGHT COMPOSITE POLYMERIC ELECTROLYTES FOR ELECTROCHEMICAL DEVICES

[76] Inventor: Joseph B. Kejha, c/o Hope Technologies, Inc., 3701 Welsh Rd., Willow Grove, Pa. 19090-1293

[21] Appl. No.: 341,622

[22] Filed: Nov. 17, 1994

[51] Int. Cl.⁶ .............................. H01G 9/15; H01M 6/18
[52] U.S. Cl. ................. 252/62.2; 429/190; 429/192; 429/193; 429/194; 429/197; 429/198
[58] Field of Search ..................... 252/62.2; 429/190, 429/192, 193, 194, 197, 198

[56] References Cited

FOREIGN PATENT DOCUMENTS

| 51-67308 | 6/1976 | Japan. |
|---|---|---|
| 59-31560 | 2/1984 | Japan. |
| 60-208053 | 10/1985 | Japan. |
| 63-199325 | 8/1988 | Japan. |
| 106272 | 3/1993 | Romania. |
| 1230110 | 4/1971 | United Kingdom. |
| WO94/06165 | 3/1994 | WIPO. |

OTHER PUBLICATIONS

Chemical Abstracts No. 118:30793 (1992).

*Primary Examiner*—Prince Willis, Jr.
*Assistant Examiner*—Alan D. Diamond
*Attorney, Agent, or Firm*—Z. T. Wobensmith, III

[57] ABSTRACT

Lightweight composite polymeric electrolytes which contain a lightweight inorganic filler, such as oxides of lithium, magnesium and sodium and which is formed by complexing an alkaline metal triflate salt, polyethylene oxide and fillers, with at least one ester, and an ether, or plurality of ethers or esters of different boiling points as co-solvents to form an electrolyte.

7 Claims, No Drawings

LIGHTWEIGHT COMPOSITE POLYMERIC ELECTROLYTES FOR ELECTROCHEMICAL DEVICES

BACKGROUND OF THE INVENTION

1. Field of the Invention

A composite solid, semi-solid, or liquid state polymer electrolyte for alkali metal or alkaline earth metal batteries, and other electrochemical devices, which contains dispersed ceramic fillers, and which may be solidified by an alkali metal or alkaline earth metal triflate salt and toughened by partial evaporation of an ether and/or ester component.

2. Description of the Prior Art

In the prior art, various polymers have been used as a component of the electrolytes of solid state alkali and alkaline earth metal batteries, and various other kinds of electrochemical devices.

Among the problems associated with many polymers is that they have inherent relatively low ionic conductivity, and may react with the component materials, which may be an alkali metal, such as lithium, or other metallic anodes to form a non-conductive boundary layer, or which have a crystalline structure that prevents the free flow of ions, and hinders rechargeability.

The prior art polymer-containing electrolytes may also exhibit poor adherence to the electrodes, do not possess sufficient strength to prevent the punching through of dendrites and consequent shorting of the battery, and lack sufficient electrochemical and temperature stability at ambient temperatures.

It is known that the introduction of inorganic fillers into a polymer matrix improves the mechanical stability, the electrochemical stability, the temperature stability range of the host polymer, and improves cycling of the device due to a reduction in interfacial contact between the alkali metal anode metal and the electrolyte.

The Hope, et al., U.S. Pat. No. 5,006,431 describes a solid state polymer electrolyte for batteries, where the electrolyte is formed by mixing an ultraviolet light or electron beam curable polymer with an electrolyte, and curing the mixture by exposure to ultraviolet light or electron beam radiation, whereby the polymer cross links and forms the electrolyte.

The Beard U.S. Pat. No. 5,147,739 describes composite anodes which contain lithium or lithium anode substrates in combination with one or more insertion compounds which consist of transition metal chalcogenides or oxides as a coating or dispersion. However, these compounds form heavy oxides which are not suitable for many applications.

The use of fillers is described in the literature in articles entitled:

*Composite Polyether Based Solid Electrolytes*, by W. Wieczorek, Dept. of Physics, University of Guelph, N1G 2W1 Guelph, Ontario, Canada; on leave from Dept. of Chemistry, Warsaw University of Technology, ul. Noakowskiego 3, 00-664 Warszawa, Poland;

*Composite Solid Electrolyte for Lithium Cells*, by Emmanuel Peled, Ganesan Nagasubranian, Gerald Halpert and Alan I. Attia of California Technical Institute, for NASA's Jet Propulsion Laboratory, Pasadena, Calif.;

*Dielectric Relaxation Studies in Composite Polymeric Electrolytes Based on PEO-$Al_2O_3$ Matrix*, by P. Pszczolkowski, M. Siekierski, and J. Przyluski, Division of Solid State Technology, Dept. of Chemistry, Warsaw University of Technology, ul. Noakowskiego 3, 00-664 Warszawa, Poland;

*Preparation and Characterization of Nanocomposites Containing Polyethers and Layered Solids*, by J. P. Lemmon, J. Wu, and M. M. Lerner, Dept. of Chemistry and Center for Advanced Materials Research, Oregon State University, Corvallis, Oreg. 97331-4003; and

*An Application of Random and Layered Polymer Nanocomposites in Lithium Polymer Batteries—a Review*, by Wlodzimierz Krawiec and Lawrence G. Scanlon, Aero Propulsion and Power Directorate, Wright Laboratory POOS- 2, Wright-Patterson Air Force Base, Ohio 45433-7251, and Emmanuel Giannelis, Dept. of Material Science and Engineering, Cornell University, Ithaca, N.Y. 14853.

While the prior art disclosures may incorporate lithium triflate, they cross link the polymer for solidification of the electrolyte, which does not occur in the present invention. In addition, the prior art devices may not contain all the required compounds, such as polyethylene oxide, as called for in the present invention and do not contain lightweight oxides such as magnesium, lithium and sodium oxides.

In another example, a liquid electrolyte has been compounded, which consisted of propylene carbonate (PC) and 1, 2 dimethoxyethane (DME) and lithium perchlorate salt. However, this liquid electrolyte mixture will not solidify when polyethylene oxide (PEO) is added.

In addition, this and like mixtures which do not contain alkali metal triflate will not solidify, if for example alkali metal salts such as lithium hexafluoroarsenate, lithium hexafluorophosphate, lithium tetrafluoroborate, and lithium bistrifluoromethylsulfonylimide are used.

While a solid state electrolyte has been made using polyethylene oxide and lithium triflate alone, it did not possess sufficient conductivity, cyclability, or strength even when propylene carbonate was added.

It is desired to improve on the reported electrolyte compositions, and it has been discovered that the addition of lightweight inorganic fillers, such as magnesium, lithium, and sodium oxide improves certain characteristics of the electrolytes, and that the compositions do not suffer from the described prior art problems.

SUMMARY OF THE INVENTION

It has now been found that composite polymer electrolytes which are highly ion conductive, inert to alkali or alkaline earth metal battery components, flexible but tough enough to resist dendrite formation, with increased electrochemical and temperature stability, and improved cycling characteristics, and resistance to high voltage breakdown, can be made by compounding alkali metal triflate salts and polyethylene oxide (PEO) to which mixtures of dispersed lightweight inorganic fillers have been added, such as oxides of lithium, magnesium, and sodium, with co-solvents of esters (particularly ethylene carbonate, propylene carbonate and dimethyl carbonate) and ethers (particularly and 1, 2 dimethoxyethane), or pyrrolidinones and ethers, or with two esters or two ethers where one of them has a higher boiling point. Solidification of the electrolyte is achieved by the presence of the alkali metal triflate salt (trifluoromethanesulfonate), and subsequent toughening of the solid state electrolyte is achieved by partial evaporation of the lower boiling point ether or ester component. If two esters or two ethers are used, the remaining lower boiling point ester or ether component further enhances ionic conductivity and cyclability.

For high voltage applications, lithium hexafluorophosphate salt (LiPF$_6$) may be added. The liquid polymer electrolytes may not contain PEO.

The principal object of the invention is to provide a composite solid, semi-solid, or liquid state polymer electrolyte for batteries and other electrochemical devices which contains a lightweight inorganic, electrically non-conductive filler, particularly oxides and peroxides of lithium, magnesium and sodium.

A further object of the invention is to provide an electrolyte of the character aforesaid that has low interfacial reactivity with electrodes.

A further object of the invention is to provide an electrolyte of the character aforesaid that has excellent adherence, desired viscosity, and low shrinkage properties.

A further object of the invention is to provide an electrolyte of the character aforesaid, that is flexible, tough and resistant to dendrite formation, but easy to handle and produce.

A further object of the invention is to provide an electrolyte of the character aforesaid which has improved electrochemical stability.

A further object of the invention is to provide an electrolyte of the character aforesaid which has improved cycling characteristics.

A further object of the invention is to provide an electrolyte of the character aforesaid which has improved temperature stability.

A further object of the invention is to provide an electrolyte of the character aforesaid that allows rapid processing and can be used for high voltage applications.

Other objects and advantageous features of the invention will be apparent from the description and claims.

DESCRIPTION OF THE PREFERRED EMBODIMENTS

Batteries such as alkali metal batteries, and for example lithium batteries, consist of at least an anode layer, a polymer electrolyte layer, and a cathode layer. Such batteries can be of virtually any desired size and configuration, and usually include additional layers such as current conducting backing layers, insulating layers and electrode connection layers.

Batteries with liquid electrolyte also require a porous, electrically non-conductive membrane in place of solid polymer electrolyte.

The polymer dielectric electrolyte layer must be compatible with the component materials used to fabricate the batteries while possessing suitable ionic conductivity.

In the described battery a base is provided, which can be a web of material such as nickel foil or carbon fibers or expanded metallized plastic film coated with a cathode material of well known type, such as described in U.S. Pat. No. 4,960,655 and the Patent Application of Joseph B. Kejha, Ser. No. 08/281,011 filed on Jul. 27, 1994.

The cathode may have an additional layer of polymeric electrolyte composition applied thereto, which composition may be of any well known polymeric material, such as polyethylene oxide and propylene carbonate compounded with a lithium salt.

An additional layer of anode material is applied on top of the electrolyte layer, which can be a base layer of carbon fibers coated with lithium as described in prior U.S. Pat. No. 4,794,059, or of lithium alloy foil to form an anode layer.

The resultant battery can be provided with other layers as desired.

The composite solid or semi-solid state polymeric electrolyte for example, which is suitable for lithium batteries, contains an ester such as propylene carbonate (PC) in the range of 20% to 90% by weight, an ether such as 1, 2 dimethoxyethane (DME) in the range of 4% to 70% by weight, an ion conductive salt, such as lithium triflate (LiCF$_3$SO$_3$) in the range of 1% to 90% by weight, polyethylene oxide (PEO) in the range of 0.2% to 60% by weight, lithium oxide (Li$_2$O) in the range of 1% to 50% by weight, or magnesium oxide (MgO) in the range of 1% to 50% by weight, or lithium peroxide (Li$_2$O$_2$) in the range of 1% to 50% by weight, or magnesium peroxide (Mg$_2$O$_2$) in the range of 1% to 50% by weight, or sodium peroxide (Na$_2$O$_2$) as well as other oxides thereof, or their mixtures. If desired, for higher voltage applications, lithium hexafluorophosphate (LiPF$_6$) in the range of 1% to 90% by weight may be added. The PC can be replaced by other esters such as butylene carbonate, ethylene carbonate, dimethyl carbonate, diethyl carbonate, and others or blends thereof; or by a pyrrolidinone such as N-methyl pyrrolidinone, 1,5-dimethyl-2 pyrrolidinone and others; or by polyethylene glycol dimethyl ether (PEGDME) which is an ether with a higher boiling point, of the same % weight range. The DME can also be replaced by other low boiling point ethers, such as 1, 2 dimethoxypropane and others or by low boiling point esters such as dimethyl carbonate and diethyl carbonate of the same percent weight range. Various combinations of ion conductive esters, ethers and pyrrolidinones are also useful, such as a plurality of esters, a plurality of esters and an ether, a plurality of ethers and an ester, and other combinations as desired.

The lithium triflate salt has a dual purpose: first, as an ionic conductor; and second, as a solidification agent of the electrolyte without cross-linking. The PEO is without side chains.

The lithium, sodium, and magnesium oxides, and peroxides are lightweight and improve the mechanical, electrochemical, temperature and interfacial stability of the composite.

It should be noted that for other alkali metal batteries, and electrochemical devices, the lithium triflate and hexafluorophosphate salts should be replaced by corresponding triflate and hexafluorophosphate salts to match the elected alkali metal.

Preferred embodiments of the invention are illustrated in the following examples:

EXAMPLE I

A sample of a composite polymeric electrolyte was formed by compounding a lithium salt and a polymeric material which consisted of 35.45% (percent) by weight of propylene carbonate (PC), 35.45% (percent) by weight of 1,2 dimethoxyethane (DME), 9.28% (percent) by weight of lithium triflate, 2.95% (percent) by weight of polyethylene oxide (PEO), and 16.87% (percent) by weight of lithium oxide (Li$_2$O).

The mixture was heated to 70° C. and became liquid, the hot liquid was applied by well known means to an electrode layer and was cooled to 33° C. or less, for 5 minutes to allow partial evaporation of the DME. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell of 3.2 to 3.6 volts, which is capable of being loaded to 3.75 mA/cm$^2$, and is rechargeable.

EXAMPLE II

A sample of a composite polymeric electrolyte was formed by compounding a lithium salt and a polymeric material which consisted of 35.45% (percent) by weight of propylene carbonate (PC), 35.45% (percent) by weight of 1,2 dimethoxyethane (DME), 9.28% (percent) by weight of lithium triflate, 2.95% (percent) by weight of polyethylene oxide (PEO), and 16.87% (percent) by weight of magnesium oxide (MgO).

The mixture was heated to 70° C. and became liquid, the hot liquid was applied by well known means to an electrode layer and was cooled to 33° C. or less, for 5 minutes to allow partial evaporation of the DME. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell of 3.4 to 3.8 volts, which is capable of being loaded to 3.75 mA/cm$^2$, and is rechargeable.

EXAMPLE III

A sample of a composite polymeric electrolyte was formed by compounding a lithium salt and a polymeric material which consisted of 35.45% (percent) by weight of propylene carbonate (PC), 35.45% (percent) by weight of 1,2 dimethoxyethane (DME), 9.28% (percent) by weight of lithium triflate, 2.95% (percent) by weight of polyethylene oxide (PEO), and 16.87% (percent) by weight of lithium peroxide (Li$_2$O$_2$).

The mixture was heated to 70° C. and became liquid, the hot liquid was applied by well known means to an electrode layer and was cooled to 33° C. or less, for 5 minutes to allow partial evaporation of the DME. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell of 3.4 to 3.6 volts, which is capable of being loaded to 3.75 mA/cm$^2$, and is rechargeable.

EXAMPLE IV

A sample of a composite polymeric electrolyte was formed by compounding a lithium salt and a polymeric material which consisted of 35.45% (percent) by weight of propylene carbonate (PC), 35.45% (percent) by weight of 1,2 dimethoxyethane (DME), 9.28% (percent) by weight of lithium triflate, 2.95% (percent) by weight of polyethylene oxide (PEO), and 16.87% (percent) by weight of magnesium peroxide (MgO$_2$).

The mixture was heated to 70° C. and became liquid, the hot liquid was applied by well known means to an electrode layer and was cooled to 33° C. or less, for 5 minutes to allow partial evaporation of the DME. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell of 3.4 to 3.6 volts, which is capable of being loaded to 3.75 mA/cm$^2$, and is rechargeable.

EXAMPLE V

A sample of a composite polymeric electrolyte for higher voltages was formed by compounding a lithium salt and a polymeric material which consisted of 35.45% (percent) by weight of dimethyl carbonate (DMC), 26.45% (percent) by weight of ethylene carbonate (EC), 9.28% (percent) by weight of lithium triflate, 9% (percent) by weight of lithium hexafluorophosphate (LiPF$_6$), 2.95% (percent) by weight of polyethylene oxide (PEO), and 16.87% (percent) of sodium peroxide (Na$_2$O$_2$).

The mixture was heated to 70° C. and became liquid, the hot liquid was applied by well known means to an electrode layer and was cooled to 33° C. or less, for 5 minutes to allow partial evaporation of the DMC. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 5.0 volts, which is capable of being loaded to 3.75 mA/cm$^2$, and is rechargeable.

EXAMPLE IV

A sample of a composite polymeric electrolyte for higher voltages was formed by compounding a lithium salt and a polymeric material which consisted of 35.45% (percent) by weight of dimethyl carbonate (DMC), 26.45% (percent) by weight of ethylene carbonate (EC), 9.28% (percent) by weight of lithium triflate, 9% (percent) by weight of lithium hexafluorophosphate (LiPF$_6$), 2.95% (percent) by weight of polyethylene oxide (PEO), and 16.87% (percent) of sodium oxide (Na$_2$O).

The mixture was heated to 70° C. and became liquid, the hot liquid was applied by well known means to an electrode layer and was cooled to 33° C. or less, for 5 minutes to allow partial evaporation of the DMC. The mixture solidified due to the presence of lithium triflate and formed a solid or semi-solid, ion-conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 5.0 volts, which is capable of being loaded to 3.75 mA/cm$^2$, and is rechargeable.

As can be seen from the above examples, this approach to producing composite polymeric electrolytes is very useful for rapid mass production of batteries and the like in a matter of minutes, instead of hours, without using ultraviolet light, electron beam or heat for cross-linking. The above described electrolytes are very highly loaded with the polar aprotic liquids, and are also useful in electrode construction.

It should be apparent that the above lithium, magnesium and sodium oxides, peroxides, and higher oxides, or mixtures thereof can be added to any polymeric solid, semi-solid or liquid electrolyte for electro-chemical devices such as batteries, capacitors and fuel cells and improve their characteristics as described.

It should of course be understood that the description is merely illustrative and that various modifications and changes can be made in the structures disclosed without departing from the spirit of the invention.

It is thus apparent that the objects of the invention have been achieved.

I claim:

1. A composite polymeric solid or semi-solid state electrolyte for batteries, capacitors and other electrochemical devices wherein the electrolyte contains an alkali metal or alkaline earth metal triflate salt, polyethylene oxide and a lightweight oxide selected from the group consisting of oxides of lithium, magnesium or sodium, compounded with a co-solvent of an ester and at least one ether, in which solidification of the electrolyte is accomplished by the presence of the triflate salt and by partial evaporation of the ether and wherein the polyethylene oxide does not cross link.

2. A composite polymeric solid or semi-solid state electrolyte for batteries, capacitors and other electrochemical devices wherein the electrolyte contains an alkali metal or alkaline earth metal triflate salt, polyethylene oxide and a lightweight oxide selected from the group consisting of oxides of lithium, magnesium or sodium, compounded with a co-solvent of an ether and at least one ester in which solidification of the electrolyte is accomplished by the presence of the triflate salt and by partial evaporation of the ether and wherein the polyethylene oxide does not cross link.

3. A composite polymeric solid or semi-solid state electrolyte for batteries, capacitors and other electrochemical devices wherein the electrolyte contains an alkali metal or alkaline earth metal triflate salt, polyethylene oxide and a lightweight oxide selected from the group consisting of oxides of lithium, magnesium and sodium, compounded with a co-solvent which consists of a plurality of ethers with different boiling points, in which solidification of the electrolyte is accomplished by the presence of the triflate salt and by partial evaporation of the lowest boiling point ether and wherein the polyethylene oxide does not cross link.

4. A composite polymeric solid or semi-solid state electrolyte for batteries, capacitors and other electrochemical devices wherein the electrolyte contains an alkali metal or alkaline earth metal triflate salt, polyethylene oxide and a lightweight oxide selected from the group consisting of oxides of lithium, magnesium and sodium, compounded with a co-solvent of a plurality of esters with different boiling points, in which solidification of the electrolyte is accomplished by the presence of the triflate salt and by partial evaporation of the lowest boiling point ester and wherein the polyethylene oxide does not cross link.

5. A composite electrolyte as defined in claims 1, or 2, or 3, or 4 which additionally contains lithium hexafluorophosphate.

6. A composite electrolyte as defined in claims 1, or 2, or 3, or 4 in which said triflate salt is lithium triflate.

7. A composite electrolyte as defined in claims 1, or 2, or 3, or 4 in which the lightweight oxide is selected from the group consisting of higher oxides of lithium, magnesium and sodium.

* * * * *